(12) United States Patent
Eyal et al.

(10) Patent No.: US 11,007,719 B2
(45) Date of Patent: May 18, 2021

(54) AUTOMATICALLY ADJUSTING EXTRUDER FOR OPTIMAL VISCOSITY IN A THREE-DIMENSIONAL (3D) PRINTER

(71) Applicant: Wine Projects Ltd., Isfya (IL)

(72) Inventors: Shay Eyal, Kiryat Bialik (IL); Dima Lokshin, Osafia (IL); Michael Roginsky, Osafia (IL)

(73) Assignee: Wine Projects Ltd., Isfya (IL)

( * ) Notice: Subject to any disclaimer, the term of this patent is extended or adjusted under 35 U.S.C. 154(b) by 357 days.

(21) Appl. No.: 15/950,661

(22) Filed: Apr. 11, 2018

(65) Prior Publication Data

US 2018/0297290 A1      Oct. 18, 2018

Related U.S. Application Data

(60) Provisional application No. 62/484,414, filed on Apr. 12, 2017.

(51) Int. Cl.
*B29C 64/393* (2017.01)
*B29C 64/118* (2017.01)
*B33Y 50/02* (2015.01)
*B33Y 30/00* (2015.01)
*B29C 64/209* (2017.01)
*B29C 64/295* (2017.01)
*B29C 64/232* (2017.01)
*B29C 64/321* (2017.01)
*B33Y 10/00* (2015.01)

(52) U.S. Cl.
CPC .......... *B29C 64/393* (2017.08); *B29C 64/118* (2017.08); *B29C 64/209* (2017.08); *B29C 64/232* (2017.08); *B29C 64/295* (2017.08); *B29C 64/321* (2017.08); *B33Y 30/00* (2014.12); *B33Y 50/02* (2014.12); *B33Y 10/00* (2014.12)

(58) Field of Classification Search
CPC ... B29C 64/118; B29C 64/209; B29C 64/295; B29C 64/321; B29C 64/393; B33Y 30/00; B33Y 50/02
See application file for complete search history.

(56) References Cited

U.S. PATENT DOCUMENTS 6,085,957 A  *  7/2000  Zinniel ................. B65H 63/08
                                                         226/8
7,747,341 B2    6/2010  Dubois et al.
(Continued)

*Primary Examiner* — Atul P. Khare
(74) *Attorney, Agent, or Firm* — M&B IP Analysts, LLC

(57) ABSTRACT

An extruder for automatically adjusting a temperature for optimal viscosity of materials extruded through a three-dimensional printer. The extruder includes a nozzle configured to extrude a material at a set viscosity; a thermal regulator located adjacent to the nozzle through which the material is extruded, where a temperature of the thermal regulator is adjustable within a predetermined range of temperatures suitable for the material; a motor configured to advance the material through the thermal regulator and the nozzle; a motion sensor configured to detect a speed of the motor as the material passes through the extruder; a current sensor configured to detect a resistance operating against the motor as the material passes through the extruder; and a controller configured to adjust the temperature of the thermal regulator for optimal viscosity of the material based on the detected speed of the motor and the detected resistance operating against the motor.

7 Claims, 4 Drawing Sheets

(56) References Cited

U.S. PATENT DOCUMENTS

| | | |
|---|---|---|
| 2016/0135493 A1 | 5/2016 | Kuo et al. |
| 2016/0193785 A1 | 7/2016 | Bell et al. |
| 2016/0218287 A1 | 7/2016 | McAlpine et al. |
| 2017/0050382 A1 | 2/2017 | Minardi et al. |
| 2017/0120513 A1* | 5/2017 | Brennan ................. B28B 1/001 |
| 2017/0312987 A1* | 11/2017 | Ladanyi ................ B29C 64/393 |
| 2018/0015655 A1* | 1/2018 | Gheorghescu .......... B29C 48/18 |

* cited by examiner

AUTOMATICALLY ADJUSTING EXTRUDER FOR OPTIMAL VISCOSITY IN A THREE-DIMENSIONAL (3D) PRINTER

CROSS-REFERENCE TO RELATED APPLICATIONS

This application claims the benefit of U.S. Provisional Application No. 62/484,414 filed on Apr. 12, 2017, the contents of which are hereby incorporated by reference.

TECHNICAL FIELD

The present disclosure relates generally to systems and methods of three-dimensional (3D) printing, and more specifically to ensuring optimal viscosity of the material being extruded by a 3D printer.

BACKGROUND

Three dimensional (3D) printers are manufacturing units designed to create a three-dimensional object by injecting material through an extruder layer by layer under computer control to create the desired object. 3D printers allow for the creation of a variety of products, parts, and the like, that can be used for producing, for example, toys for children, parts for cars, parts for the high-tech industry, weapons, and more.

The technology currently used by most 3D printers is called fused deposition modeling (FDM) that creates object using an "additive" principle by laying down material in multiple layers. A plastic filament or metal wire is unwound from a coil and supplies material to produce a 3D object. The 3D object is produced by extruding small flattened strings of molten material to form layers, where the material hardens immediately after extrusion from the nozzle.

One significant disadvantage of existing 3D printers is that they are typically designed only for use of a limited number of materials such as, polyurethane, nylon, and the like, to produce the 3D object. In many cases, a 3D printer is designed to for use with only one predefined material. Although some 3D printers allow the use of a wider range of materials, this requires a complicated and lengthy set-up phase for adjusting the 3D printer controller and the electro-mechanical components of the 3D printer for each material, as each material can have different properties and extrusion requirements.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include an extruder for automatically adjusting a temperature for optimal viscosity of materials extruded through a three-dimensional printer. The extruder includes a nozzle configured to extrude a material at a set viscosity; a thermal regulator located adjacent to the nozzle through which the material is extruded, where a temperature of the thermal regulator is adjustable within a predetermined range of temperatures suitable for the material; a motor configured to advance the material through the thermal regulator and the nozzle; a motion sensor configured to detect a speed of the motor as the material passes through the extruder; a current sensor configured to detect a resistance operating against the motor as the material passes through the extruder; and a controller configured to adjust the temperature of the thermal regulator for optimal viscosity of the material based on the detected speed of the motor and the detected resistance operating against the motor.

Certain embodiments disclosed herein also include a method for automatic adjustment of a temperature of an extruder of a three-dimensional (3D) printer for an optimal viscosity of materials extruded therethrough. The method includes: collecting a first data set indicative of a speed of a motor of a 3D printer during a printing process, wherein the motor is configured to advance a material through a thermal regulator and through a nozzle; collecting a second data set indicative of a level of resistance that operates against the motor during the printing process; determining a first viscosity of the material extruded through the thermal regulator and the nozzle using the first data set and the second data set; and adjusting the temperature in the thermal regulator, based on the determination of the first viscosity, for printing the material in a second viscosity, if the first viscosity is not approximately a second viscosity, wherein the second viscosity is the optimal viscosity.

Certain embodiments disclosed herein also include a non-transitory computer readable medium having stored thereon instructions for causing a processing circuitry to perform a process. The process includes: collecting a first data set indicative of a speed of a motor of a 3D printer during a printing process, wherein the motor is configured to advance a material through a thermal regulator and through a nozzle; collecting a second data set indicative of a level of resistance that operates against the motor during the printing process; determining a first viscosity of the material extruded through the thermal regulator and the nozzle using the first data set and the second data set; and adjusting the temperature in the thermal regulator, based on the determination of the first viscosity, for printing the material in a second viscosity, if the first viscosity is not approximately a second viscosity, wherein the second viscosity is the optimal viscosity.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
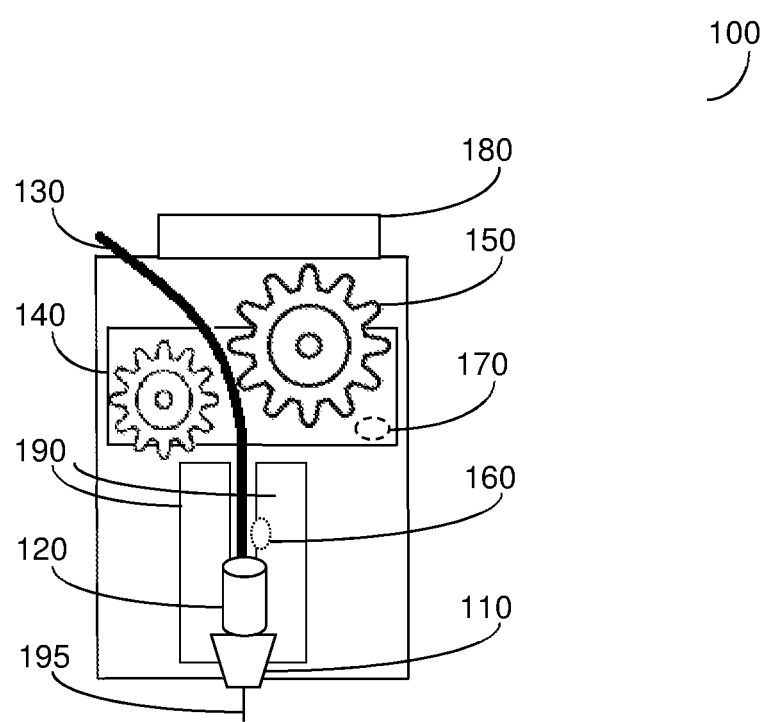
FIG. 1 is a schematic diagram of an extruder for a 3D printer that automatically adjusts for an optimal viscosity of materials according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include an extruder for a 3D printer that is configured for automatic adjustment of the viscosity of a plurality of materials that may be dispensed through the extruder. The extruder includes a nozzle through which a material is output. The extruder further includes a thermal regulator placed adjacent to the nozzle that is used to heat up the extruded material, and a plurality of sensors controlled by a controller, which is connected to the various components of the extruder. The controller is configured to adjust the temperature of the thermal regulator so as to achieve optimal viscosity of the material when the 3D printing takes place. This is done based on, among other parameters, the speed of the 3D printer's motor and the resistance operating against the motor during the 3D printing. These parameters may be collected from speed and current sensors of the plurality of sensors.

FIG. 1 is a schematic diagram of an extruder 100 for a 3D printer (not shown) that automatically adjusts for optimal viscosity of materials extruded therethrough according to an embodiment. The extruder 100 comprises a nozzle 110 through which a material is extruded, or pushed through a die, at a viscosity optimal for 3D printing. The nozzle 110 may be physically connected to the extruder 100 via, for example, a screw thread. The extruder 100 further comprises a thermal regulator 120 that is adjacent to the nozzle 110 through which at least one material 130 is melted and extruded. In an embodiment, a temperature of the thermal regulator 120 is controllable within a predetermined range of temperatures for reaching the melting point of a wide variety of materials.

The extruder 100 further includes a motor 140 configured to advance material. The motor 140 may be for example, a direct current (DC) motor, an alternating current (AC) motor, and the like. In an embodiment, the motor is connected to a plurality of gears 150 adapted to advance the material. At least one of the plurality of gears 150 is driven directly by the motor 140 and is configured to allow the material 130 to flow through the thermal regulator 120 for melting and thereafter output through the nozzle 110 for 3D printing. The extruder 100 further includes a plurality of sensors, such as a motion sensor 160 for detection of the motor's speed or the material's advancement during the 3D printing, a current sensor 170 for detection of a resistance operating against the motor during the 3D printing, and the like. The motion sensor 160 may be positioned within the extruder adjacent to where the material 130 flows therethrough. The current sensor 170 may be connected to the motor 140 and configured to detect of the current of the motor 140 that may indicate the resistance that operates against the motor 140.

The extruder 100 further includes a controller 180 configured to continuously adjust the temperature of the thermal regulator 120 for optimal viscosity of the material 130 extruded by the extruder 100. The adjustment occurs responsive to a collection and analysis of data by the controller 180 associated with at least the motor's 140 speed and the resistance operating against the motor 140 during the 3D printing using the motion sensor 160 and the current sensor 170, as further described herein below.

In an embodiment, the extruder 100 may be communicatively connected via a wired or wireless connection to the controller 180. In an embodiment, the controller 180 is additionally configured to control an entire 3D printer and may be positioned at a different section of the 3D printer and not necessarily physically connected to the extruder 100. The controller 180 is further described herein below with respect to FIG. 2. In an embodiment, the extruder 100 further includes a guide 190 through which the material 130 flows towards the nozzle 110.

According to an embodiment, the controller 180 may be configured to collect a first data set from the motion sensor 160 that indicates the speed of the motor 140 during a printing process. For example, the speed of the motor 140 may be 250 revolutions per minute (RPM). The printing process requires the motor 140 to push the materials 130, using, e.g., gears 150, through the thermal regulator 120 for melting and thereafter through the nozzle 110 for printing 3D elements. The controller 180 collects a second data set from the current sensor 170 that indicates the level of resistance that operates against the motor 140 during the printing process. For example, the second data set may indicate that the electric current of the motor 140 is 5 amperes.

The controller 180 is configured to perform a first analysis of the first data set for identifying the speed of the motor 140, and a second analysis of the second data set for identifying the resistance that operates against the motor 140. Based on the first and second analyses, the controller 180 calculates the viscosity of the material 130 for determining whether the viscosity is optimal for an application. If the viscosity is determined to not be optimal, the controller 180 changes the temperature in the thermal regulator 120, based on the determined viscosity, for printing the material with optimal viscosity. In an embodiment, the first viscosity is compared to an optimal viscosity, e.g., a viscosity value saved in a reference table. If the first viscosity is approximately equal to a second viscosity determined to be an optimal viscosity for a material being used, no change is necessary. A first viscosity is approximately equal to a second viscosity if the viscosity values are within a predetermined threshold of a reference viscosity value, namely an optimal viscosity. If the first viscosity falls outside of the predetermined threshold value, a change to the temperature of the material, caused by a change of the temperature of the thermal regulator 120, is required.

Various materials 130, such as polymer, glass, chocolate, and so on, may be used for printing 3D elements using the extruder 100, where each material 130 has a different basic viscosity when inserted into the extruder 100. Therefore, the extruder 100 enables to collect several parameters such as the current in the motor 140 that indicates the resistance that operates against the motor, and the speed of the motor for calculating the viscosity of the specific material extruded through the extruder 100. For example, when using chocolate as the material 130, the controller 180 may identify that the resistance that operates against the motor is relatively low, and that the speed of the motor 140 is relatively high, comparing to printing with polymer-based materials. Thus, by calculating these parameters of speed and current the controller 180 is able to adjust the temperature of the thermal regulator 120 such that the material is melted and output as a molten material 195 in an optimal viscosity through the nozzle 110. The optimal viscosity is viscosity that is neither too thick nor too fluid such that the material is able to be printed with a high accuracy that is almost identical to the initial plan, e.g., a digital blueprint.

The extruder 100 is configured to enable the rapid and accurate adaption and adjustment of the viscosity of materials used for printing 3D elements with a 3D printer by controlling at least the temperature of the thermal regulator 120 embedded within the extruder 100. The data collected from one or more sensors may be indicative of several parameters that, when analyzed and calculated, enable the determination of whether a temperature adjustment is required. Thus, the extruder 100 enables the adjustment of the viscosity of the material extruded therethrough by controlling the temperature of the thermal regulator 120, allowing for the production of 3D objects using a wide range of materials by automatically identifying the optimal temperature for melting each material. In an embodiment, the identification of the optimal temperature is based on real-time calculation of the speed and resistance to determine the current viscosity. The results of these parameters can be compared to predetermined values, e.g., values stored in a database, such that a difference between a current viscosity and optimal viscosity can be identified.

Figure 2:
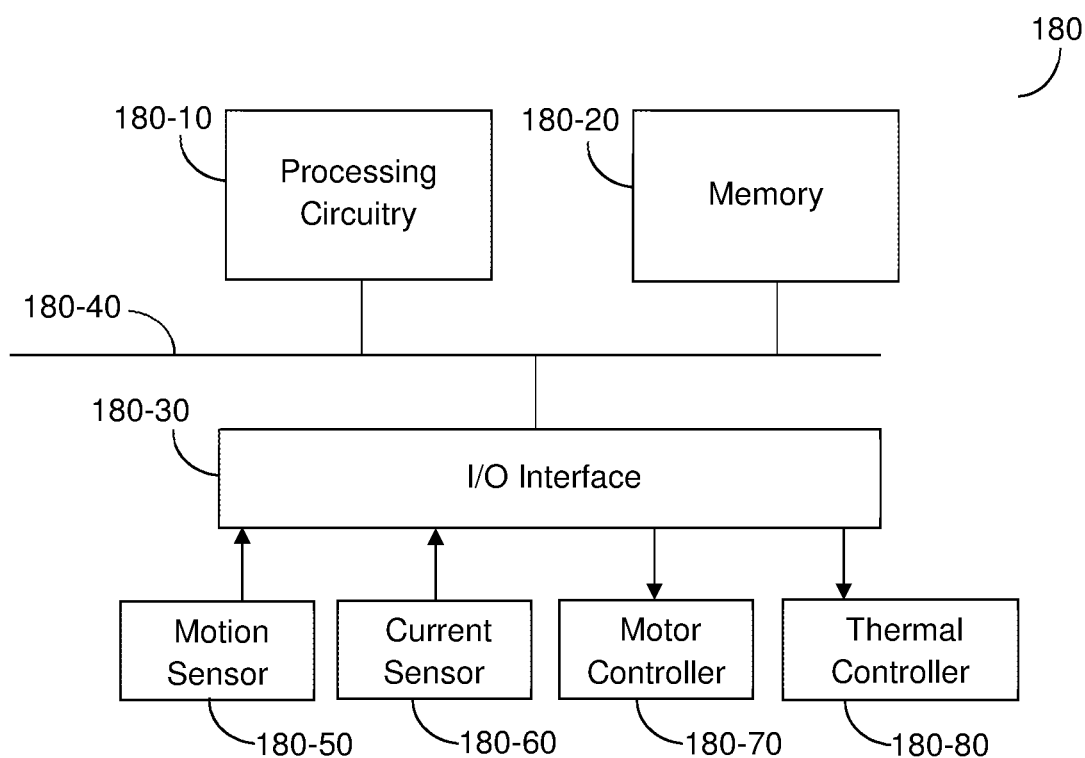
FIG. 2 is a block diagram of a controller configured to control the extruder of a 3D printer according to an embodiment.

FIG. 2 is a block diagram of a controller 180 configured to control an extruder 100 according to an embodiment. The controller 180 comprises a processing circuitry 180-10 that may include a hardware component and a software component (not shown). The processing circuitry 180-10 may be configured to receive data corresponding to processes associated with the extruder's operation, analyze and calculate the data, determine appropriate commands to be executed by the extruder 100 corresponding to the analysis of the data, and the like.

The processing circuitry 180-10 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The controller 180 further includes a memory 180-20. The memory 180-20 may include therein instructions that when executed by the processing circuitry 180-10 configure the controller 180-10 to perform actions as further described herein. Instructions may include code (e.g., in source code format, binary code format, executable code format, or any other suitable format of code).

The controller 180 further comprises an input/output (I/O) interface 180-30 that may be configured to collect or receive data from a plurality of sensors, such as a motion sensor 180-50, a current sensor 180-60, and the like. In an embodiment, the I/O interface 180-30 may be configured to send operational commands to, e.g., a motor controller 180-70, a thermal regulator controller 180-80, and the like, in order to perform various actions determined by the processing circuitry 180-10. The diverse actions may include, for example, changing the temperature in the thermal regulator 120 to enable optimal temperature for melting of the material extruded by the extruder. According to an embodiment, the components of the controller 180 may be communicatively connected via a bus 180-40, such as a physical connection, e.g., Ethernet, or wireless connection, e.g., via Bluetooth, Wi-Fi and the like.

Figure 3:
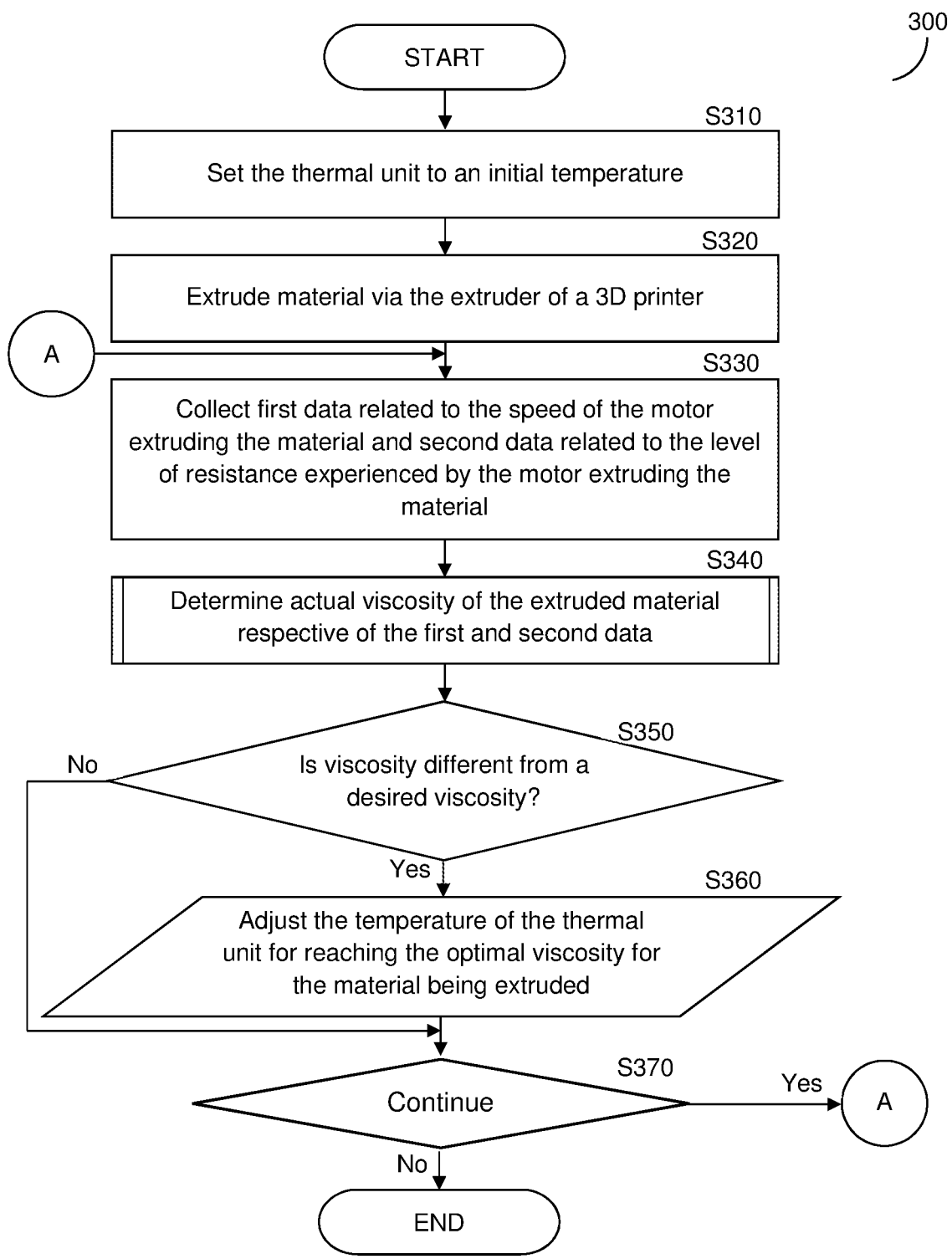
FIG. 3 is a flowchart of a method for automatically adjusting an optimal viscosity of materials extruded through an extruder of a 3D printer according to an embodiment.

FIG. 3 is a flowchart of a method 300 for the automatic adjustment of an extruder a of a 3D printer for an optimal viscosity of materials extruded therethrough according to an embodiment. At S310, a thermal regulator is set to an initial temperature. The initial temperature may be determined based on a desired printing plan, an average temperature used for 3D printing one or more 3D elements using one or more materials, and the like.

At S320, material is extruded via the 3D printer by pushing material through a nozzle. In an embodiment, at least one of a plurality of gears driven by a motor is utilized for pushing the material through a guide towards the thermal regulator.

At S330, a first data set relating to the speed of the motor extruding the material is collected, and a second data set relating to the level of resistance experienced by the motor extruding the material is collected.

At S340, an actual viscosity of the extruded material is determined based on the first data set and the second data set. In an embodiment, the determination of the viscosity of the material is based on the result of the calculation of the first data set with respect to the second data set. In an embodiment, the first data set, second data set, or a calculation based thereon is compared to predetermined values, e.g., values stored within a storage that indicate viscosity levels of various materials.

At S350, it is checked whether the viscosity is different from a target viscosity of the material and, if so, the execution continues with S360, otherwise execution continues with S370. At S360, the temperature of the thermal regulator is adjusted to ensure the optimal viscosity for the material being extruded. For example, if the initial temperature is 80 degrees and the viscosity of the material is different from the desired viscosity that enables accurate printing, the temperature is adjusted to a higher or a lower temperature to ensure the material reaches the optimal viscosity. In an embodiment, the temperature values are compared to predetermined values as noted above. At S370, it checked whether to continue the operation and if so, execution continues with S330; otherwise, execution terminates.

Figure 4:
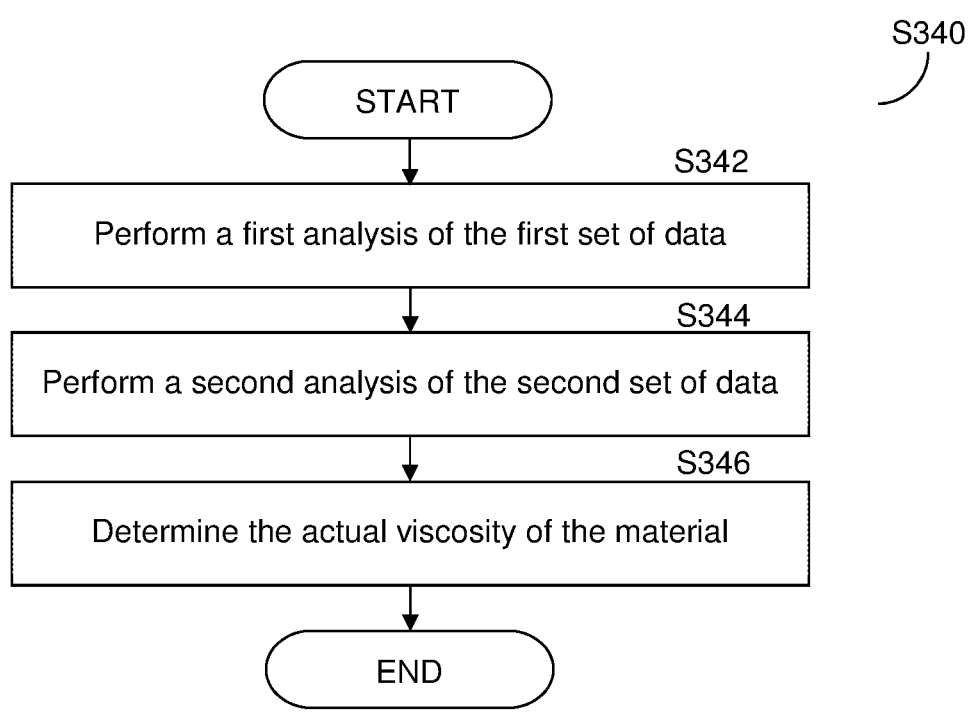
FIG. 4 is a flowchart of a method for determining the viscosity of the material extruded through an extruder of a 3D printer according to an embodiment.

FIG. 4 is a flowchart of a method S340 for calculating the viscosity of the material extruded through an extruder of a 3D printer according to an embodiment. At S342, a first analysis of a first data set is performed to determine a speed of a motor. The first data set is collected from a motion sensor and indicates the speed of a motor of a 3D printer during the printing process. In an embodiment, the first analysis may include conversion of values included within the first data set to values that may be utilized for calculating the viscosity of the material.

At S344, a second analysis of the second data set is performed to determine the resistance that operates against the motor. The second data set collected from a current sensor represents the current in the motor and indicates the level of resistance that operates against the motor while is extruded through the extruder. The second analysis may include converting values included within the second data set to values that may be utilized for calculating the viscosity of the at least one material.

At S346, the actual viscosity of the material extruded through the extruder is determined. The determination is achieved based on calculations of the first data set with respect to the second data set. According to an embodiment, a controller, e.g., the controller 180 of FIGS. 1 and 2, compares the first and the second data sets for identification of the current viscosity of the material. In an embodiment, the data sets are compared to predetermined values, e.g., values stored on a storage, such as in a table, to determine viscosity of various materials. For example, in case the first data set indicates that the speed of the motor is above a predetermined first threshold, and the second data set indicates that the current in the motor is below a predetermined second threshold, the controller may determine that the viscosity is relatively low. As another example, in case the first data set indicates that the speed of the motor is relatively low, and the second data set indicates that the current in the motor is relatively high, the controller may determine that the viscosity is relatively high.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processing circuitry is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An extruder for automatically adjusting a temperature for optimal viscosity of a material extruded through a three-dimensional (3D) printer, the extruder comprising:
    a nozzle configured to extrude a material at a set viscosity;
    a thermal regulator located adjacent to the nozzle through which the material is extruded, wherein a temperature of the thermal regulator is adjustable within a predetermined range of temperatures suitable for the material;
    a motor configured to advance the material through the thermal regulator and the nozzle;
    a motion sensor configured to detect a speed of the motor as the material passes through the extruder;
    a current sensor configured to detect a resistance operating against the motor as the material passes through the extruder; and
    a controller configured to adjust the temperature of the thermal regulator to reach optimal viscosity of the material based on a determination of viscosity of the material being extruded made by comparing the detected speed of the motor and the detected resistance operating against the motor with predetermined values therefor that indicate viscosity levels of the material.

2. The extruder of claim 1, further comprising:
    a guide located adjacent to the thermal regulator, wherein the guide is configured to guide the material through the thermal regulator and the nozzle.

3. The extruder of claim 1, wherein the controller further comprises:
    a processing circuitry;
    a memory; and
    an input/output (I/O) interface connected to the motion sensor, the current sensor, the processing circuitry, and the memory;
    wherein the memory contains instructions that, when executed, cause the processing circuitry to adjust the temperature of the thermal regulator based on input from the motion sensor and the current sensor.

4. The extruder of claim 1, further comprising:
    a plurality of gears connected to the motor, wherein the plurality of gears is configured to advance the material through the extruder.

5. The extruder of claim 1, wherein the motion sensor is further configured to detect motion of the material passing through the extruder.

6. The extruder of claim 1, wherein the optimal viscosity is determined based on comparison to predetermined viscosity values of various extrudable materials.

7. The extruder of claim 1, wherein the controller is further configured to calculate the viscosity of the material being extruded by performing a first analysis of a first data set collected from values of the detected speed of the motor, performing a second analysis of a second data set collected from the detected resistance operating against the motor, and comparing the first and second data sets to the predetermined values.

* * * * *